United States Patent

Lieberman

[15] 3,698,153
[45] Oct. 17, 1972

[54] AUTOMATIC LOADING, ARRANGING AND DISPENSING DEVICE FOR ARTICLES AND INCLUDING CONTAINERS, POUCHES AND THE LIKE

[72] Inventor: Abraham Buddy Lieberman, St. Leonard, Canada

[73] Assignee: Glolok Co., Ltd., St. Leonard, Montreal, Canada

[22] Filed: Oct. 6, 1969

[21] Appl. No.: 863,823

[30] Foreign Application Priority Data

Sept. 25, 1969 Canada..........................63105

[52] U.S. Cl. .....................53/61, 53/159, 53/189, 53/260
[51] Int. Cl. ...................B65b 57/10, B65b 35/30
[58] Field of Search..........53/59, 159, 164, 187, 188, 53/189, 190, 244, 260, 263, 385, 61; 198/33 R; 214/6 P, 6 K; 221/68, 93, 174, 175, 177-181

[56] References Cited

UNITED STATES PATENTS

| 1,058,865 | 4/1913 | Horntvedt................53/244 X |
| 2,977,002 | 3/1961 | Asp............................214/6 K |
| 3,126,105 | 3/1964 | Marguet....................214/6 K |
| 3,468,100 | 9/1969 | Rubel..........................53/189 |
| 3,512,336 | 5/1970 | Rosecrans..................53/164 |

*Primary Examiner*—Robert L. Spruill
*Attorney*—Ronald K. McFadden

[57] ABSTRACT

The invention refers to an automatic loading, arranging and dispensing device for articles and including containers, pouches and the like, in which the device has an article loading and arranging section provided with a plurality of self-guiding and aligning walls which are adapted to receive the articles individually and to be actuated thereby for guiding and collating the articles in vertical and aligned positions in the loading and arranging section and to dispense the same therefrom by automatically dropping them, as a unit, vertically into an outer bag or other closures.

14 Claims, 17 Drawing Figures

PATENTED OCT 17 1972

*INVENTOR*

Abraham Buddy Lieberman

INVENTOR

Abraham Buddy Lieberman

PATENTED OCT 17 1972

INVENTOR

Abraham Buddy Lieberman

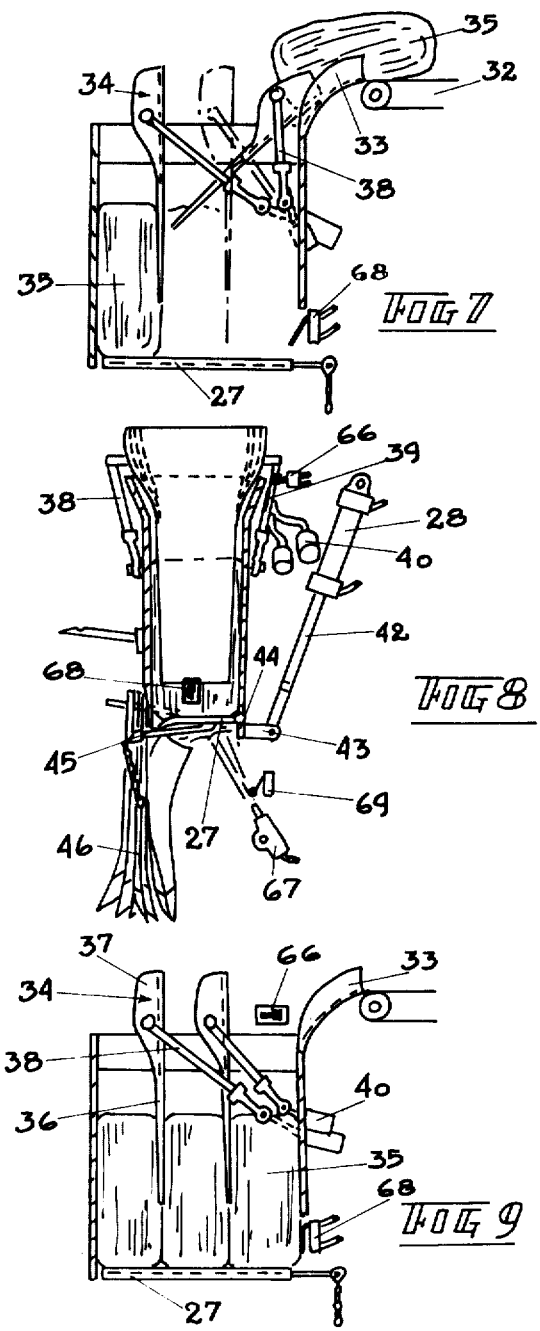

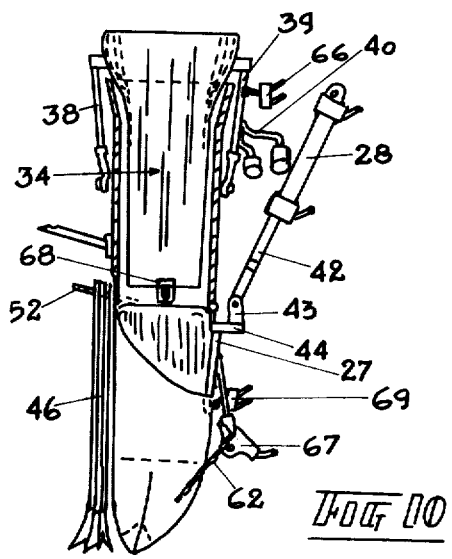
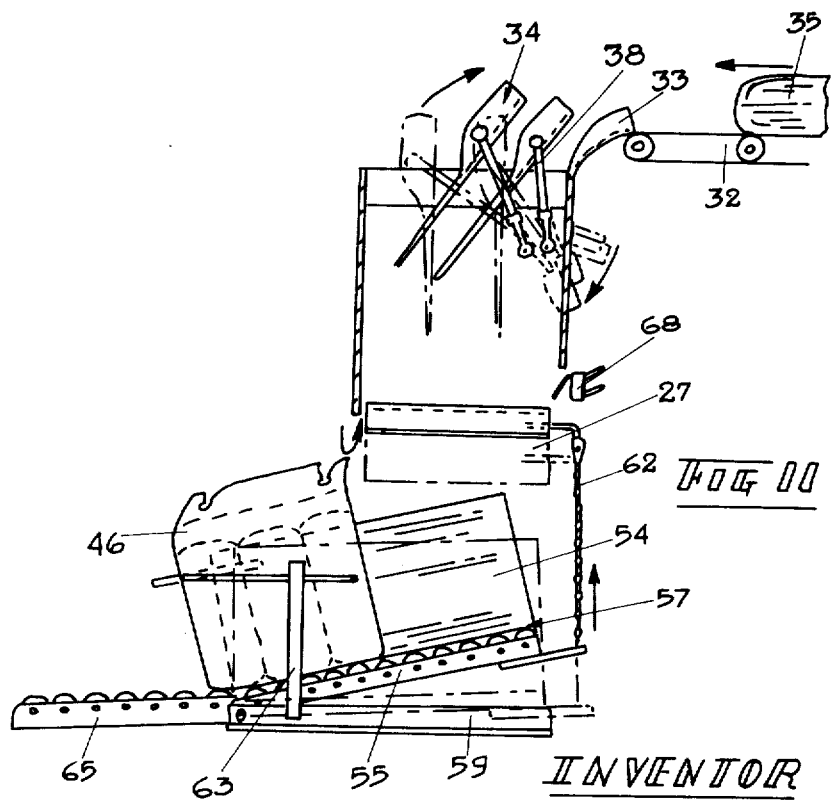

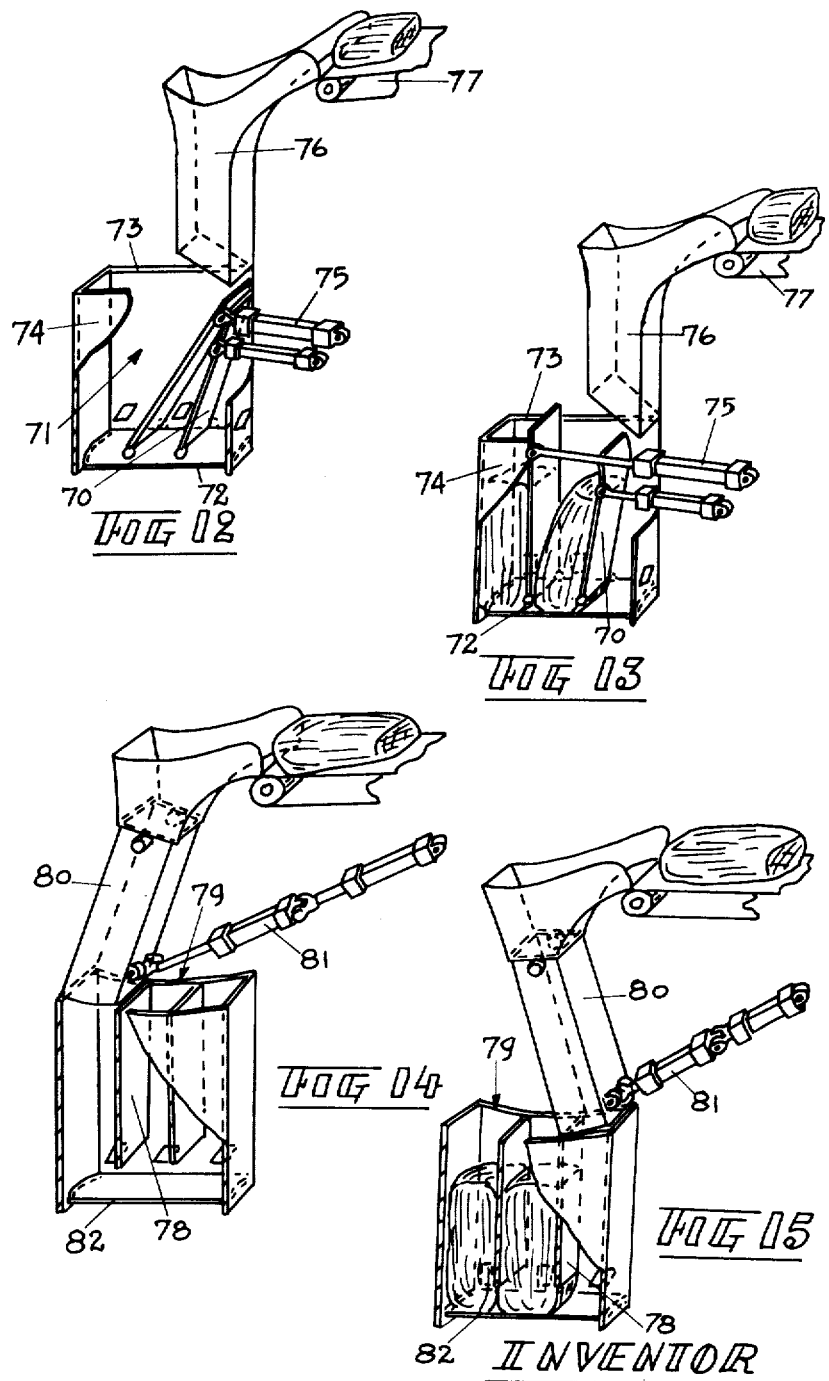

AUTOMATIC LOADING, ARRANGING AND DISPENSING DEVICE FOR ARTICLES AND INCLUDING CONTAINERS, POUCHES AND THE LIKE

The invention relates to improvements in an automatic loading, arranging and dispensing device for articles and including containers, pouches and the like as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

In the following description and accompanying drawings, the device is described as being utilized for the purpose of loading, aligning and dispensing liquid mild pouches, in predetermined quantities, into outer bags or equivalent containers and forwarding onto a tying or other closing station, but it will of course be understood that with or without modifications or ramifications, the device may be used for the loading, arranging, dispensing and bagging of various other articles.

In the following description, and in the claims, various details will be identified by specific names for convenience; the names, however, are intended to be generic in their application.

It is conventional in the industry to provide automatic packaging machines for articles or commodities of various types and in such machines the individual commodity to be packaged, such as liquid milk, is automatically measured and fed into pouches made from polyethylene or other materials and which are sealed and then delivered from the machine for distribution and shipment.

At the present time, it is the custom to fill and seal the liquid milk in one-quart pouches and which are generally sold in three-quart units, and then packed in outer bags made from suitable flexible material such as polyethylene.

In such methods used in bagging filled pouches, the bags are placed in a horizontal position and the filled pouches are rammed or pushed therein, the pouches frictionally engage with the sides of the bags, and particularly the bottom side that is in a horizontal position, and create a drag therewith and this, with the pressure being built up by the ramming or pushing operations and the resultant binding of the pouches with one another, may cause a possible rupture of the pouches through the weakening of the seams or abrasions to other portions thereof, and therefore it is generally necessary to use oversize outer bags so as to partly overcome the possibilities of such defects occurring.

In other previous methods to facilitate easier insertion of the pouches into the horizontally arranged bags, it is to spray the inside of the bag with water or other moistening substance, so that the pouches will slide therein more smoothly. An objectionable feature to this method is that the moisture will remain in the bag, much to the disapproval of the person handling and removing the pouches from the bag.

In other methods, manual labor is used in inserting the filled pouches into outer bags, and in all instances, mistakes may be made in the packaging of the pouches as they are thrust in their respective bags, with the result that the bags may contain less or more of the pouches than the requisite amount needed.

It is therefore the purpose of this invention to avoid such defects and other shortcomings of previous methods used in the bagging of filled pouches or other articles by devising an automatic loading, arranging and dispensing device that will automatically load and collate the pouches or other articles in predetermined quantities and vertically drop them into bags or other containers and forward them on for tying or closing operations, distribution, shipment or other disposal.

Among other objects of the invention is to devise a means whereby individual articles or containers, such as pouches and the like, are automatically collated in predetermined groups of two, three or more and automatically set in upright positions, and in their vertical position are dispensed into bags, shipping containers and the like, or for overwrapping tautly in a cellulose film or other sealable wrap, or simply tie them together by banding or by other suitable means.

Another object of the invention is to automatically insert the pouches or other articles in the loading chamber of the device and align them with each other and then automatically release them in their aligned positions into a bag or container for further disposition.

Still another object of the invention is to devise a means for bagging pouches or other articles in which the operation is accomplished with the greatest of economy, both from the point of automation and efficiency in the collation of the pouches or other articles together for the bagging or packing operation.

A further object of the invention is to minimize the possibility of breakdowns, delays and interruptions in the operational runs of the production line caused by bottlenecks and in having insufficient and inadequate means for handling the pouches or other articles as they leave the packaging machines after being filled and sealed, and installing thereinplace an all automatic device for receiving the pouches or other articles from the packaging machines, setting and collating the pouches in an upright position, bagging the pouches in that position, and then forwarding them on for further disposition.

A still further object of the invention is to devise a device that will be made of few and simple parts, easy to assemble and operate, durable in construction and efficient for its purpose.

Other and further advantages and improvements of the invention will be readily understood and appreciated from the description of the device in its operation set forth in the specification below when read in connection with the drawings illustrating various embodiments of the invention.

In the drawings:

FIG. 7 is an end schematic view of the article loading and aligning section of the device after the commencement of the loading operation, illustrating one article loaded in the section and another article about to be loaded therein for aligning position with the first deposited article.

FIG. 8 is a side schematic view of the automatic loading and dispensing device illustrating an article, forming a part of the completed load in the loading and aligning section of the device, coming in contact with an actuating valve for operating an air cylinder, thereby causing the trapdoor of the loading section to swing downwardly and the simultaneous engagement with the foremost bag of a stack, suspended from a supporting unit, for opening and expanding the upper portion of the bag.

FIG. 9 is an end schematic view of the article loading and aligning section of the device after the loading and alignment of the articles has been completed therein and about to be automatically released therefrom.

FIG. 10 is an end schematic view of the device, illustrating the articles being dispensed into a bag.

FIG. 11 is a side schematic view of the device, illustrating the loading and aligning walls returning to their original positions for receiving another load of the articles for insertion into the loading and aligning section.

FIG. 12 is a perspective schematic view of a modified form of the invention, illustrating the loading and aligning walls being located within the loading and arranging section and operated therewithin.

FIG. 13 is a perspective schematic view of the device as shown in FIG. 12 and illustrating the loading and aligning walls in operation.

FIG. 14 is a perspective schematic view of another modification of the device in which the loading and aligning walls are fixedly secured within the loading and aligning section and the chute being movable.

FIG. 15 is a perspective schematic view of the device, as shown in FIG. 14, illustrating the loading and aligning section being partly filled and the movable chute in position for receiving the final portion of the load for entering the section.

Figure 1:
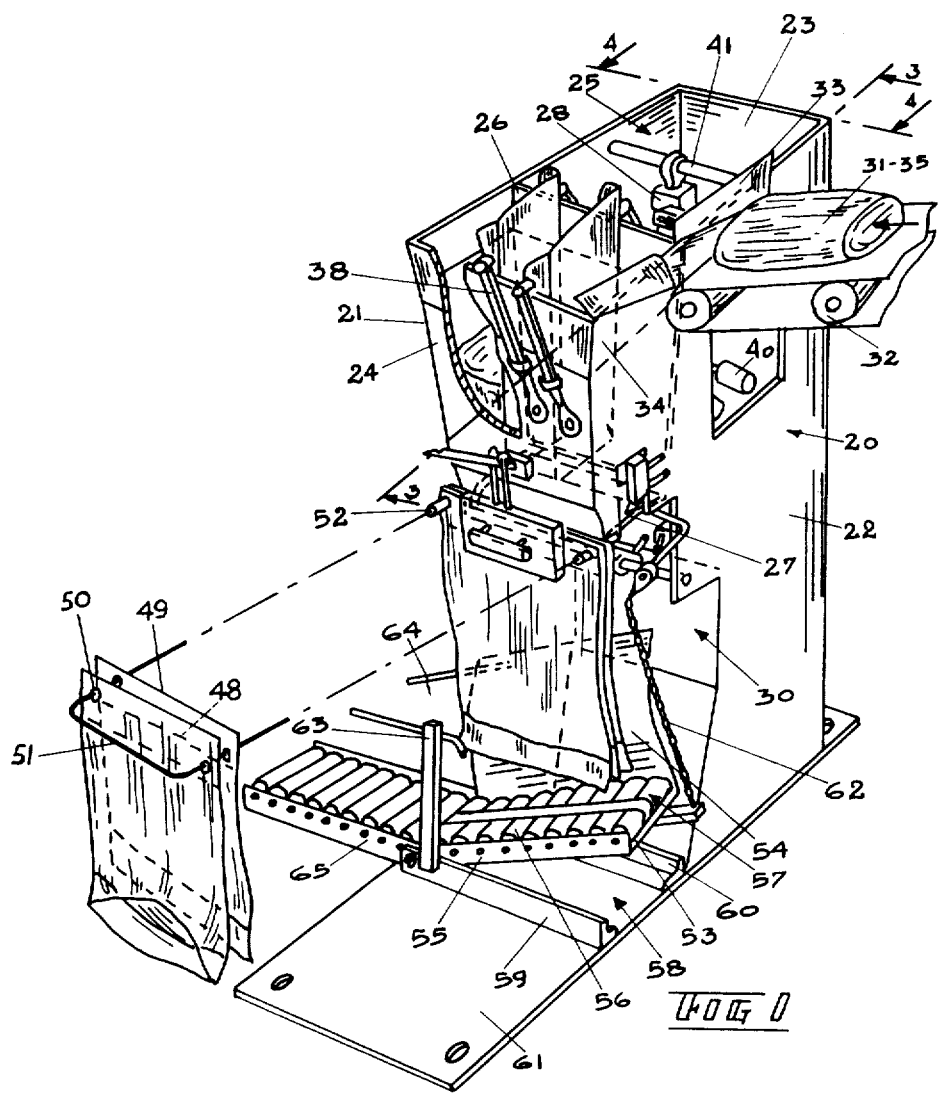
FIG. 1 is a perspective view of the automatic loading and dispensing device.
Figure 2:
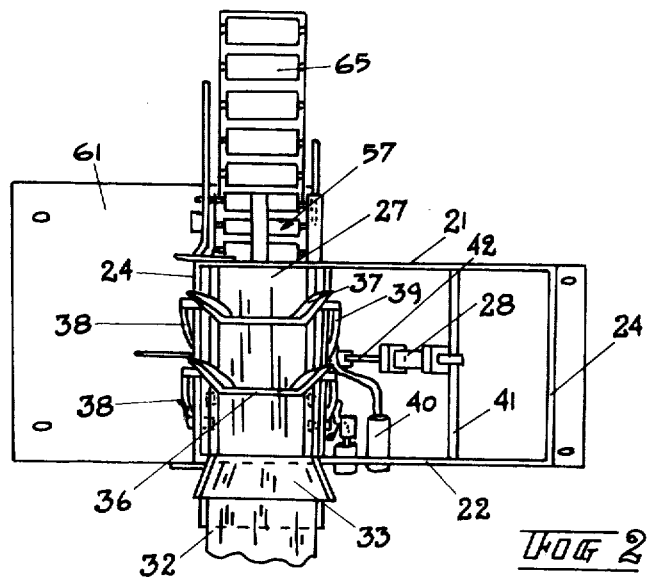
FIG. 2 is a plan view of FIG. 1.
Figure 3:
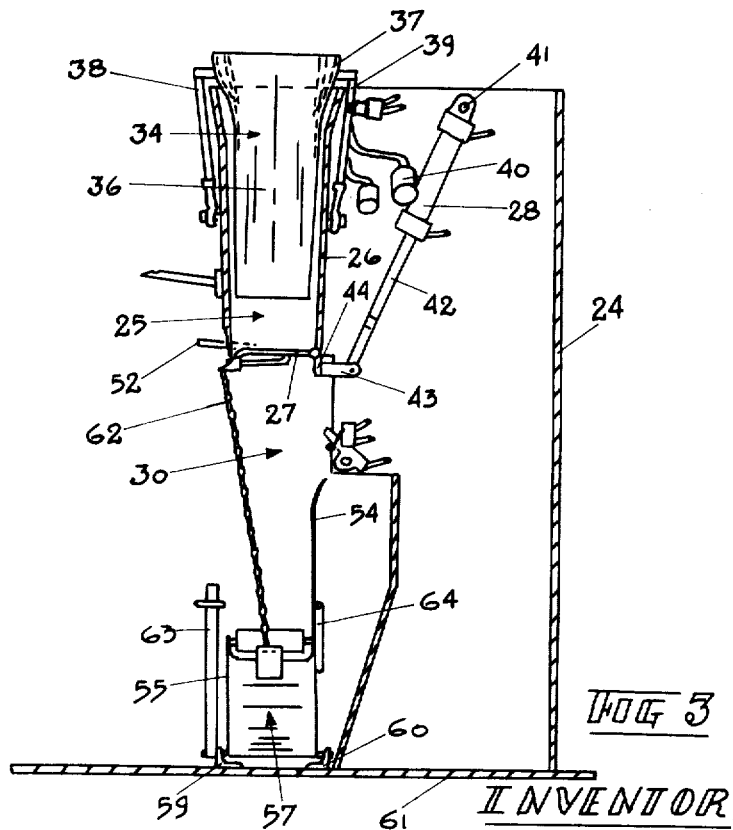
FIG. 3 is a longitudinal sectional view as taken along the line 3—3 in FIG. 1.
Figure 4:
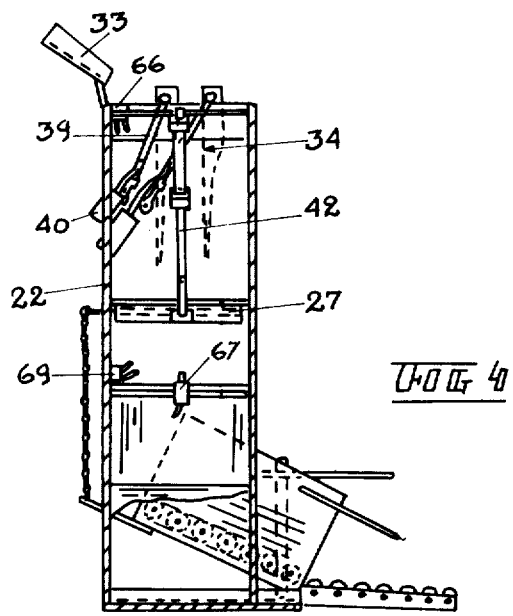
FIG. 4 is a cross-sectional view as taken along the line 4—4 in FIG. 1.
Figure 5:
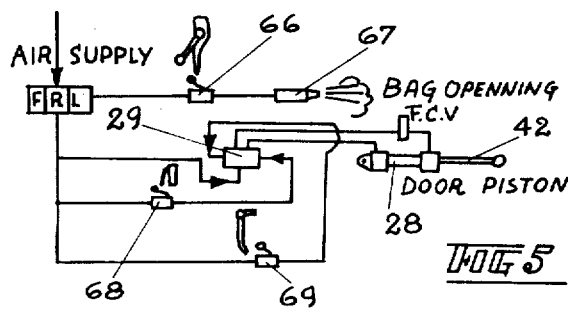
FIG. 5 is a schematic diagram illustrating the control system for the loading and dispensing device.
Figure 6:
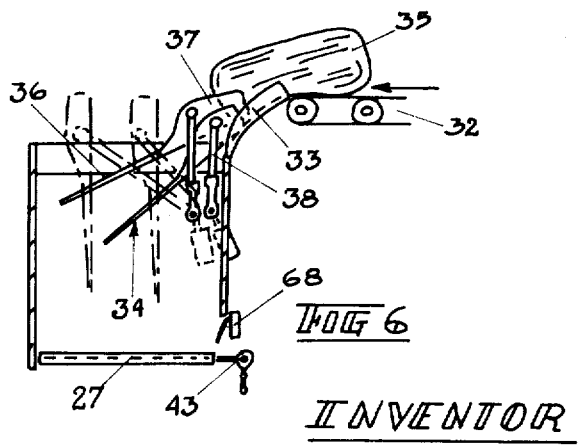
FIG. 6 is an end schematic view of the article loading and aligning section of the device, showing the position of the aligning walls therein at the commencement of the loading operation.
Figure 16:
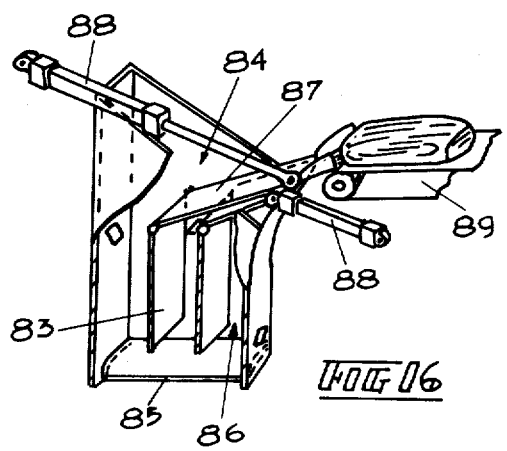

FIG. 16 is a perspective schematic view of a further modification of the device in which each of the loading and aligning walls is operated by means located and extending from opposing sides of the loading and aligning section.

Figure 17:
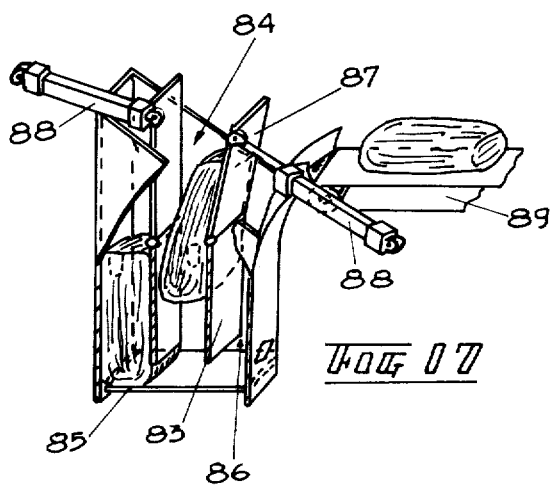

FIG. 17 is a perspective schematic view of the device, as shown in FIG. 16, illustrating the loading and aligning section being filled with the requisite articles.

Like numerals of reference indicate corresponding parts in the various figures.

Referring to the drawings, the device is provided with a casing, as indicated by the numeral 20, and which is formed of opposing side walls 21 and 22, the rear wall 23 and the front wall 24. The casing protrudes outwardly in its upper portion to form an article loading and arranging section 25, and which is bounded by the side walls 21 and 22, the front wall 24 and the transverse partition 26 which is joined to the side walls 21 and 22. The bottom wall of the section 25 is formed of a trapdoor 27 which is automatically controlled to open and close by any suitable means, such as by the air cylinder 28 that is controlled by an actuating valve 29.

The article dispensing section 30 of the device is located below the article loading and arranging section 25 and forms the portion of the device in which the articles are dropped into bags, containers, banded together or overwrapped.

The articles, such as pouches, are filled with liquid or powdered milk and sealed in a suitable packaging machine (not shown), and removed therefrom by a conveyor or other suitable means and fed into or onto a chute 33, which leads into the article loading and arranging section.

The structure of the guiding and aligning walls 34 that are located in the article loading and arranging section 25 may be varied in accordance with the kind of articles that are being loaded, arranged and dispensed through the device, but as illustrated in FIGS. 1 to 11, the guiding and aligning walls are particularly adapted for the handling of articles that are somewhat in the shape of sealed pouches 35 filled with liquid or powdered milk.

Each of the guiding and aligning walls 34, as illustrated, is formed of a flat rectangular plate 36 provided with the side flanges 37 which are located at its receiving end and constitute guide rails for the pouches as well as brackets to which the upper ends of an oscillating arm 38 and a counterweight arm 39 are pivotally secured, the lower portions of the oscillating arm and the counterweight arm being pivotally secured to the front wall 24 and the transverse partition 26. An offset counterweight 40 is secured to the counterweight arm 39, or other suitable means may be used, such as a returning spring, for the purpose of automatically returning the guide and aligning wall from its vertical position to its receiving position.

The number of guiding and aligning walls that are used in the device may vary in accordance to the size of the device and the type of articles that are being passed therethrough, but as illustrated they are in multiples of two. These guiding and aligning walls are suspended into the article loading and arranging section 25 and are adapted to be oscillated therein from horizontal or slanting positions to vertical positions or vice versa, and have their upper or receiving end portions projecting upwardly from the section 25.

When the guiding and aligning walls 34 are in their semi-horizontal or article receiving positions, the receiving end portions of the aligning walls 34 are adapted to overlap one another and to be brought in alignment with the chute 33 and maintained in that position by the counterweight 40 until an article, such as a filled pouch, is delivered from the chute 33 onto the receiving end portion of the foremost aligning wall 34 and along the elongated plate portion thereof, and as the weight of the pouch is greater than the weight of the counter-weight, this will cause the aligning wall to be tilted or oscillated in a downward and vertical position, thus causing the pouch to be dropped in an upright position onto the trapdoor 27 of the loading and arranging section 25, and held in that position.

The next or rearmost guiding and aligning wall continues to remain in its article receiving position through the weight of its counterweight until the next article or filled pouch is delivered from the chute 33 onto the receiving end portion of the aligning wall, and along its plate portion, thereby tilting the aligning wall downwardly and causing the pouch to drop downwardly in an upright position onto the trapdoor and held in that position through its engagement abutment with the two aligned and vertically positioned walls. The third pouch is now delivered from the chute 33 and dropped in an upright position down the space formed between the rearmost guiding and aligning wall and the side wall 22 of the device.

The loading and collating of the pouches or other articles into the article loading and arranging section of the device is now completed, and the load of pouches is now ready to be dropped through the trapdoor and into the dispensing section of the device.

In the compartment formed by the side walls 21 and 22, the rear wall 23 and the transverse partition 26, are located the operating means for controlling the movements of the trapdoor and the dispensing and bagging mechanism, and which, in this instance, is accomplished by fluid power, consists of an air cylinder 28 that is mounted on the transverse rod or shaft 41, which is secured to the side walls 21 and 22. The air cylinder is suitably connected to an air compressor (not shown) and has the operating plunger rod 42, the lower end of which is connected to the link 43 extending from a downwardly projecting plate or bracket 44 that is secured to the rear edge of the trapdoor 27 and, through the automatic control of the actuating valve 29, will open and close the trapdoor.

The trapdoor 27 is hingedly secured to the side walls 21 and 22 and has an outer bag engaging lip or hook 45 forming a part of its front edge or suitably secured thereto, and when the trapdoor is in its opening operational movement, the lip or hook 45 will engage with an outer bag 46 of a stack 47, located in or adjacent to the dispensing section 30, for the opening and expansion of the bag and causing the bag to be brought into alignment with and beneath the article loading and arranging section 25.

These outer bags may be made from plastic or equivalent material and have an open top 48 and an upper flap 49 extending upwardly beyond the open top of the bag and through which perforations 50 are made for the insertion of the free ends of a U-shaped bail 51 or other supporting rack for holding a stack of bags in an upright position. Each bail, with its complementary supply of bags, is adapted to engage with a pair of hollow studs 52 projecting from the casing and in or adjacent to the dispensing section for the transference of the stack of bags from the bail to the studs and thence to be withdrawn into the dispensing section area below the trapdoor of the article loading and arranging section 25.

The discharge unit of the dispensing section for forwarding on the filled outer bags to other stations, such as a station for tying the open ends of the bags (not shown), shipping or for other disposition, may be accomplished in various ways. An acceptable type of discharge unit, as illustrated, consists of a rectangular-shaped unit having a bottom wall 53 provided with an upwardly extended side wall 54 and an opposing flanged side wall 55 and forming a trough therebetween and in which a plurality of transverse idler rolls 56 are journalled to the side walls 54 and 55 and completing a ramp 57.

The ramp 57, which is adapted to be oscillated, in its horizontal position sits itself in the fixed trackway 58 that is provided with the parallel side flanges 59 and 60 and which are fixedly secured to the base 61 of the device and located beneath and in alignment with the trapdoor opening of the article loading and arranging section 25. One end of the ramp is pivotally secured to the inner end portions of the parallel side flanges of the trackway while the other end of the ramp is centrally connected by the operating chain or rod 62 to the trapdoor 27. The discharge unit is further provided with the guide bag rail 63 that is mounted on the trackway and the guide bag rail 64 that is secured to the upwardly extended side wall 54 of the oscillating ramp 57. At the pivoted end portion of the oscillating or tiltable ramp is located the horizontal conveyor 65 provided with the idler rolls 66 and which is adapted to receive the bags from the oscillating ramp when it is in its tilted position.

In the article receiving position of the guiding and aligning walls, a central valve 66 is located in the article loading and arranging section 25 in easy accessibility contact by the receiving end portion of one of the aligning walls 34, such as the second or rearmost of the aligning walls in its receiving position, and is for the control of the air nozzle 67. When the guiding and aligning wall, which is in the accessibility contact area of the control valve 66, is in its receiving position, it is in direct contact with the valve 66 and closes the same and automatically shuts off any air under pressure flowing from the air nozzle; however when the second pouch is delivered from the chute 33 onto the aligning wall that is in contact with the valve 66, it will tilt the aligning wall and release the same from its valve contact, thereby placing the valve in its "open" position, and permit the air to flow under pressure from the air nozzle and upwardly against the top of the front outer bag of a stack of bags 47 hanging in the front position of the dispensing section 30 of the device and the blast of air causes the upper portion of the bag to bellow open.

When the third or last pouch is dropped into the loading and arranging section 25, it will automatically actuate a control valve 68 and cause the plunger rod 42 of the air cylinder to tilt the hinged trapdoor downwardly and automatically causing the bag engaging lip or hook 45 of the trapdoor to latch on the upper edge of one wall of the open top of the bag, made from polyethylene or other suitable flexible material, and pull the same away from its opposing wall so as to expand the outer bag sufficiently to permit the collated pouches, in their set positions, to drop into the outer bag and by their combined weight causing the now filled bag to self-detach itself from its supporting studs, through splitting the material of the bag from its perforated points to the top edge of the bag wall, thus permitting the bag to drop onto the discharge unit of the dispensing section of the device.

When the trapdoor is in its open or down position, it will automatically come in contact with a return control valve 69 and automatically "shutoff" the air nozzle, which will be only reopened when the guiding and aligning walls 34 return to their article receiving positions.

When the last pouch has made contact with the control valve 68, and indirectly caused the trapdoor to literally drop away from its support of the pouches, and the pouches in their collated assembly falling into the waiting open mouth of the outer bag located therebeneath, two operations are immediately effected. one operation is that the tilted position of the ramp, which is held up by the closed position of the trapdoor, is dropped to a horizontal position so that the filled bag will fall on a flat contact surface of the ramp, and simultaneously the second operation is effected as the pouches leave the article loading and arranging section; the control valve 68 immediately causes the trapdoor, through the operation of the air cylinder and plunger rod to return to its "closed" position; this immediately causes the trapdoor to raise and tilt the ramp and thereby causing the filled bag to slide down the ramp onto the horizontal conveyor, and thence taken away.

In FIGS. 12 and 13 is illustrated a modification of the invention and in which the guiding and aligning walls 70 are totally located within the loading and arranging section 71 of the device. The guiding and aligning walls are shown as a multiple of two and extend downwardly and transversely into the section 71 and terminate short of the trapdoor 72, which forms the bottom wall of the section. The lower ends of the aligning walls are pivotally secured to two of the opposing walls 73 and 74 of the section 71 and are suitably spaced apart while the upper ends of the aligning walls are connected to and operated by actuating rods 75, which are motivated by a suitable source of power.

In the article receiving positions of the guiding and aligning walls, the aligning walls are tilted, through their actuating rods, from their fixed pivotal positions to form downwardly extending ramps, the upper portions of which abut one another and are in alignment and beneath the outlet of the hopper 76, which is fed by the article conveyor 77. The loading and assembling of the articles, such as pouches, is automatically controlled and operated in a similar manner as previously described in the acceptable form of the invention. The first pouch is dropped from the hopper onto the first or foremost sloping aligning wall and, as the pouch reaches the trapdoor, forming the bottom wall, or on its way down, it will come in contact with a control valve and automatically cause the valve to energize, through its source of power, the actuating rod connected to the first or foremost aligning wall and tilt and maintain the same in a vertical position; the same operation is repeated for the second or rearmost aligning wall; a third or last pouch is dropped in the space formed between the fixed wall of the section and the rearmost aligning wall, and the operation for opening the trapdoor and dispensing and packaging the collated pouches into outer bags is similar to those operations already described for the acceptable form of the invention.

In FIGS. 14 and 15, there is shown a further modification of the invention and in which the guiding and aligning walls 78 are fixedly secured in vertical and transverse positions inside the article loading and arranging section 79 and, together with the casing walls of the device, form the loading and collating compartments. The hopper 80 constitutes the articulating means for distributing and collating the articles into the compartments of the section 79 and is suitably operated by the actuating rod or rods 81. The usual trapdoor 82 and the valve controls and operating means are similar to those already described and illustrated in the previous modifications.

In the modification illustrated in FIGS. 16 and 17, the guide and aligning walls 83 are each arranged in the article loading and arranging section 84 in a vertical and transverse position, spaced apart from one another and secured to the casing wall. The aligning walls 83 terminate short of the trapdoor 85, which forms the bottom wall of the section 84, and together with the section walls complete the loading and collating compartments 86.

The ramp walls 87 are hingedly secured to the upper portions of the aligning walls 83 and are connected to actuating rods 88 which are operated by fluid power or other poser source, and these ramp walls, in their article receiving position, are actuated in sloping and abutting position with one another so as to receive the articles delivered to them from the conveyor 89 for the individual automatic distribution and collation of the articles into the loading and collating compartments 86. The operation of the loading and collation of the articles into the article loading and arranging section, the dispensing of the articles and the bagging of the same are similar to those already described in the previous forms of the invention.

Since certain changes may be made in the above invention and different embodiments of the invention could be made without departing from the scope thereof, it is intended that all matter contained in the above description or shown in the accompanying drawings shall be interpreted as illustrative and not in a limiting sense.

What I claim is:

1. In an automatic loading, arranging and dispensing device for articles and including containers, pouches and the like, a casing, an article loading and arranging section in said casing, an article feed inlet leading into said article loading and arranging section, an article dispensing section located beneath said article loading and arranging section, a plurality of guiding and aligning walls in said loading and arranging section, a trapdoor forming the bottom wall of said article loading and arranging section and separating the same from said article dispensing section, and automatic means for articulating at least one of said guiding and aligning walls and said trapdoor and adapted to load and collate the articles received from said article feed inlet in a downward position in said article loading and arranging section and for automatically opening said trapdoor for releasing the completed load of assembled and collated articles in their downward positions into said article dispensing section for their automatic disposal in their assembled and collated positions downwardly into bags and other closures.

2. The device as claimed in claim 1, characterized by the fact that the articles being loaded and collated in said article loading and arranging section and their expulsion therefrom into the article dispensing section for their further disposal self-effect the contact and timing control for the operation of the automatic means for articulating said guide and aligning walls and said trapdoor.

3. The device as claimed in claim 1, characterized by the fact that guiding and aligning walls are suspending into the article loading and arranging section and at least one wall thereof is adapted to be oscillated therein from an off-horizontal position to a downward position and vice versa.

4. The device as claimed in claim 1, characterized by the fact that at least one of said guiding and aligning walls is pivotally mounted to said article loading and arranging section for oscillating movement and provided with a counterweight for maintaining a guiding and aligning wall in its article receiving position, the position of which is adapted to be upset upon an article being fed onto said guiding and aligning wall and causing the same to be oscillated downwardly to a vertical position and permitting the lower end of the article to engage with said trapdoor and to abut an adjacent vertical wall of said loading and arranging section and thereby locking and isolating the article in an upright position therewithin.

5. The device as claimed in claim 3, characterized by the fact that, upon the completion of the vertical loading and aligning of the articles into said loading and arranging section, the said articles being adapted to self-effect the control and timing of the operating means and causing said trapdoor to be opened and to self-eject themselves in their assembled and collated positions into the dispensing section for automatic disposal into bags and other closures in their original vertical assembled and aligned positions.

6. The device as claimed in claim 3, characterized by the fact that said guiding and aligning walls in their article receiving positions are adapted to have their receiving end portions overlapping one another and to automatically disengage themselves from one another upon receiving their individual article load and to oscillate, through the weight of said load, to vertical positions and effect the setting up of the articles into vertical and aligning positions in said article loading and arranging section.

7. In an automatic loading, arranging and dispensing device for articles and including containers, pouches and the like, a casing having opposing side walls and opposing end walls, an article loading and arranging section in said casing and confined by said opposing side walls and end walls, a transverse partition secured to two of said opposing walls and completing the vertical confines of said article loading and arranging section, a trapdoor forming the bottom wall of said article and arranging section, an article feed inlet leading into said article loading and arranging section, a dispensing section located below said loading and arranging section and in alignment with the trapdoor thereof, a plurality of guiding and aligning walls in said article loading and arranging section, at least one of said guiding and aligning walls being pivotally mounted in said loading and arranging section and adapted to be oscillated from an article receiving position to a downward position upon receiving and being engaged by an article, means for automatically returning said guiding and aligning wall to its receiving position upon release of the completed article load from said loading and arranging section into said dispensing section, and means for automatically opening and closing said trapdoor.

8. The device as claimed in claim 7, characterized by the fact that an air cylinder operated by fluid power has a plunger rod which is connected to said trapdoor for opening and closing the same.

9. The device as claimed in claim 8, characterized by the fact that a stack of outer bags is suspended in said dispensing section and located below and adjacent to said trapdoor, an air nozzle situated adjacent to said stack of bags and adapted to flow air under pressure upwardly against the top of the foremost bag of the stack and to cause the upper portion thereof to bellow open, and said trapdoor having a bag engaging lip at its front edge which is adapted to engage the open top of the outer bag for the expansion thereof as the trapdoor is being tilted downwardly in its opening operation.

10. The device as claimed in claim 7, characterized by the fact that a discharged unit is located in said dispensing section and consists of a fixed trackway situated beneath and in alignment with said trapdoor of said article loading and arranging section, a ramp formed with a bottom wall and opposing side walls and having transverse idler rolls journalled in the side walls thereof, said ramp having one end pivotally secured to said trackway, and means secured to the other end of said ramp for raising and lowering the angle position of said ramp with relation to said fixed trackway.

11. The device as claimed in claim 10, characterized by the fact that said means for raising and lowering the angle position of said ramp with relation to said fixed trackway is secured to said trapdoor and operated by the movements of said trapdoor.

12. In an automatic loading, arranging and dispensing device for articles and including containers, pouches and the like, an article loading and arranging section, a trapdoor forming a bottom wall of said loading and arranging section, a dispensing section beneath said article loading and arranging section, at least one guiding and aligning wall located within said article loading and arranging section and extending downwardly and transversely therein and terminating short of said trapdoor, said guiding and aligning wall having its lower portion pivotally secured to said loading and arranging section, and means connected to the upper portion of said guiding and aligning section for actuating the same from its pivotal position inside said loading and arranging section.

13. In an automatic loading, arranging and dispensing device for articles and including containers, pouches and the like, a casing, an article loading and arranging section, a trapdoor forming a bottom wall of said loading and arranging section, a dispensing section below said loading and arranging section, guiding and aligning walls fixedly secured in vertical and transverse positions inside said loading and arranging section and forming therewith loading and collating compartments, a hopper leading into said loading and arranging section and having its upper portion pivotally secured to said casing and adapted to receive articles fed from an article conveyor, and means connected to the lower portion of said hopper for actuating the same into alignment position with each of said loading and collating compartments.

14. In an automatic loading, arranging and dispensing device for articles and including containers, pouches and the like, and article loading and arranging section, a trapdoor forming a bottom wall of said loading and arranging section, a dispensing section below said loading and arranging section, an article feed inlet leading into said article loading and arranging section, guide and aligning walls fixedly secured in a vertical and transverse position inside said loading and arranging section and forming therewith loading and collating compartments, ramp walls hingedly secured to the upper portions of said guide and aligning walls, and means connected to said ramp walls and adapted to actuate said ramp walls in individual sloping and abutting positions with one another so as to form article receiving positions at the article feed inlet and their individual actuation for their alignment with their corresponding fixed guide and aligning walls for the individual automatic distribution and collation of articles into said loading and collating compartments.

* * * * *